Oct. 11, 1966  W. E. ELDRED  3,278,668
METHOD OF MANUFACTURING BELTS
Filed Aug. 22, 1963  2 Sheets-Sheet 1

INVENTOR.
WENDELL E. ELDRED
BY
Richard G. Geib
ATTORNEY

Oct. 11, 1966    W. E. ELDRED    3,278,668
METHOD OF MANUFACTURING BELTS
Filed Aug. 22, 1963    2 Sheets-Sheet 2
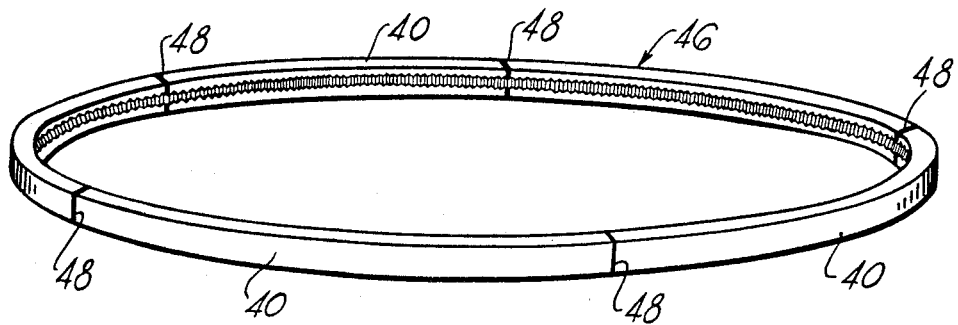
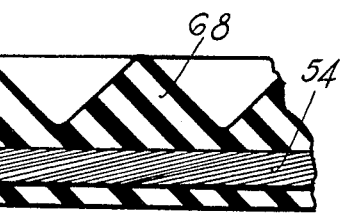
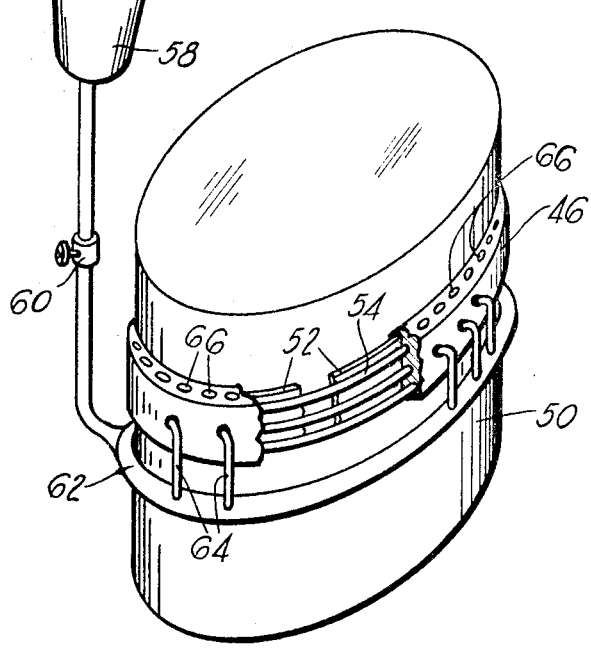
INVENTOR.
WENDELL E. ELDRED
BY Richard G. Geib
ATTORNEY United States Patent Office 3,278,668
Patented Oct. 11, 1966

3,278,668
METHOD OF MANUFACTURING BELTS
Wendell E. Eldred, South Bend, Ind., assignor to The Bendix Corporation, South Bend, Ind., a corporation of Delaware
Filed Aug. 22, 1963, Ser. No. 303,735
6 Claims. (Cl. 264—219)

This invention relates to a method of fabrication of a high strength, extra light, very flexible member suitable for incorporation in light-weight mechanisms, as may be used in aircraft, for transmitting power and/or supporting loads.

More particularly, it is the primary purpose of my invention to fabricate a thin, flexible load-carrying belt from a plurality of flexible cables composed of relatively small, high-strength wires or other high-tensile strength filaments.

A principal object of my invention is to provide a method of manufacturing the belt which is simple, reliable and practicable.

Other objects and advantages will become readily apparent to those skilled in the art to which my invention relates from the following description of the drawings in which:

FIGURE 4 is an isometric view of the attachment of a plurality of the final mold segments by butt joints to create a resilient ring mold;

FIGURE 5 is an isometric view of a set-up utilizing the resilient ring mold about a drum to cast a reinforced belt; and FIGURE 6 is a side view of a belt cast with the equipment of FIGURE 5.

Figure 1:
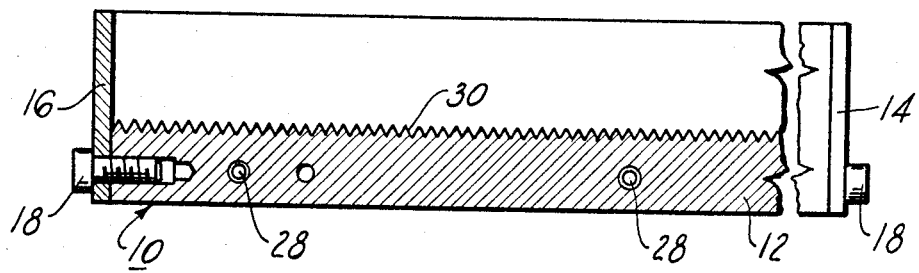
FIGURE 1 is a cross-sectional view of a pattern for constructing an intermediate mold.
Figure 2:
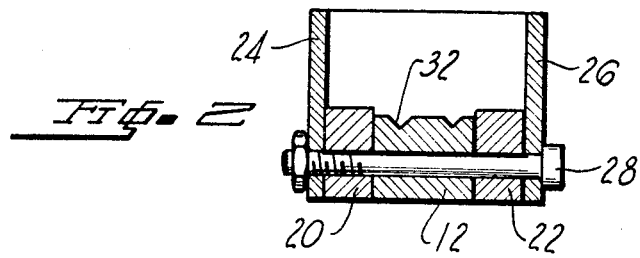
FIGURE 2 is a cross-sectional end view of the pattern of FIGURE 1.

With more particular reference to the drawing, I show in FIGURE 1 a pattern 10 having a central casting 12 with end plates 14 and 16 joined thereto as by bolts 18. The central casting 12, as seen in FIGURE 2, is also held between lateral spacers 20 and 22 and side walls 24 and 26 as by the bolts 28. As seen in the drawings, one of the forms I have used has the central casting 12 provided with a transverse tooth configuration 30 and, as seen in FIGURE 2, with a longitudinal tooth pattern 32.

Figure 3:
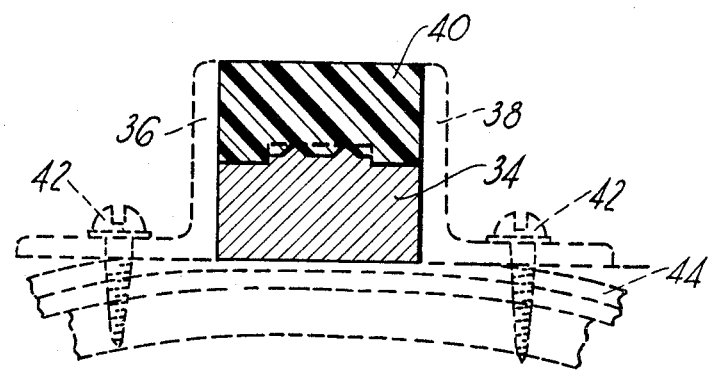
FIGURE 3 is a cross-sectional view of the intermediate mold held between a pair of angle pieces shown in phantom forming a means to cast a final mold segment.

From this pattern I propose to form a reverse or intermediate mold 34 (see FIGURE 3) from plaster, plastic, low melting point metal or other suitable compounds. The reverse mold 34 is then placed within the confines of angle irons 36 and 38 such that a cavity is formed in which I pour a liquid rubber or other suitable liquid which will be flexible upon solidification to form a final mold segment 40. In the embodiment shown by FIGURE 3 I have mounted the angle irons 36 and 38 by means of screws 42 to an underlying surface.

The final mold segments are then trimmed, if not previously cast to an exact increment of tooth length, and bonded into a continuous ring 46 by cemented butt-joints 48 or by similar cemented butt-joints having a continuous reinforcing elastomeric layer added about the periphery of the length 46.

I wish to note that if a toothed configuration is desirable, the pitch of the lateral or cross-teeth on the original mold is made at some arbitrary increment of width shorter than that desired in the final article, within five or ten percent. The final flexible mold is made through the steps previously described to be shorter than the desired finished product by an equal percentage. Then the flexible ring 46 is stretched over a drum 50 to overlie an elastomeric strip 52 and spiral cable wrapping 54 which strip and cable may be joined as by a coat of resin, etc., or held by electromagnets within drum 50'. The final flexible mold is stretched enough to give the desired pitch of the cross-teeth so that they will mate similar teeth machined in a pulley or similar device with which the belt will be operated. The reason for doing this is so that the stretch of the mold will hold it in place on the cylindrical form or drum 50 with sufficient tension to prevent it from slipping by gripping the form snugly due to its elongation. As seen in FIGURE 5, after this final mold is in place, it is filled with a liquid elastomer 56 flowing from a hopper 58 through the valve 60 into a manifold 62 having feed tubes 64 connected with openings that are drilled through the final mold 46. The elastomer flows over the cables 54 and into the tooth cavities of the final mold, if such a design is desired and hardens into a coating 68, see FIGURE 6. A plurality of suitable vent holes 66 are provided in the top of the ring 46 to extend through to the mold channel thereof so that the air trapped in the channel or cavity may be freely vented. In some instances it is desirable to also have flexible tubes affixed to the vent holes 66 so that any excess resin may be collected, thus preventing it from running over the exterior of the molds.

This method of fabrication is suitable either for making one belt at a time or a large number of belts merely by duplicating the number of rings on the drum 50 and by providing several manifolds similar to 62 along the length thereof connected with the hopper 58 through the valve 60.

As may be fully appreciated, there may be many alternate versions of the method of manufacturing as well. For example, the aforedescribed method of manufacture primarily covers liquid elastomers that harden by catalyzing agents or heat. It may be desirable to fabricate a belt from elastomers that will normally be processed by a method which is commonly termed "vulcanizing," wherein uncured sheet stock is utilized rather than liquid. In this case the basic cylindrical mold coated with a parting agent would be utilized. Around this mold would be wrapped an uncured strip of thickness slightly greater than the finished thickness desired, between the cables and the outer layer of the belt. This extra thickness is to allow the uncured rubber to flow through at least half the space between the cables. The cable is wrapped and retained in place as described in the liquid method. Then an additional uncured rubber layer of the desired width of the belt is wrapped around the spirally wrapped cable. The total volume of the two uncured strips of rubber shall be sufficient to make up the entire volume of the belt, less the volume of the cable used. Then a segmented, metallic, annular, channel-shaped mold with or without teeth in the bottom, shall be drawn down into abutting juxtaposition by strips or other means to force the uncured rubber around the cable into the desired shape and/or tooth form of the belt. This is then cured by the heating of the assembly to the proper temperature and length of time as required of the particular elastomer to cure it properly by means well known to the rubber art. Again, upon removal of the metal external mold, the part is stripped axially. The metal mold may have some suitable vents or notches cut into it so that a slight excess of rubber may be used to assure full filling of the mold. This excess of rubber may extrude through the vents or notches and be cut off the finished belt by a sharp knife or other means. While it was not previously mentioned, the external mold whether metal or flexible, will also be coated with a suitable parting agent enabling it to be readily removed from the finished article.

If, for example, a free-ended belt is desired, a method of fabrication of greater accuracy and lower cost for smaller quantities, than is permitted by the extrusion method, incorporates the use of a flexible rubber mold with its variations as described above. However, instead of wrapping a single cable around a cylindrical mold to form one continuous belted loop, a series of cables are wrapped at one time parallel to each other with the desired spacing, starting at one end of a long drum and spirally wrapped together in a continuous helix to the desired length. Over this helical band of spaced wires, a continuous channel-shaped flexible mold similar to 46 would be wrapped with sufficient tension to hold it in place to be filled with the liquid elastomer described above. Inasmuch as it would be difficult to control the exact stretch of free-ended belt, as compared to a looped belt, the transverse grooves (if used) would be made so that they have the identical spacing to the mating pulleys on which it is run. Then, in order to prevent the flexible mold from stretching lengthwise when wrapping, use will be made of several flexible cables which will be embedded lengthwise in the mold.

While this description has assumed a vertical cylindrical mold, it could readily be adapted for horizontal use if desired, with minor adaptation of feeding and vents to suit. A variation of this method of fabrication would be to use permanent rigid molds of metal of other materials segmented and clamped in place around the cylindrical mold and elastomer strips and cables so as to provide a readily removable cavity for the elastomer. When the liquid elastomer has set up, either by means of a catalyst and/or applied heat, the external flexible or solid molds would be removed and the finished belt removed from the cylinder by slipping it off axially. In order to promote production, the elastomer may only be set up to the point where it can be handled and removed from the mold and the full strength of the compound developed by proper curing in a separate oven or other processing as required.

I have also found that it could be desirable to precoat the cable with a layer of elastomer by extrusion or other suitable method. The thickness of this elastomeric coating would be the same as the desired thickness of rubber on the outside of the belt and preferably one-half the width of the spacing between the sides of the adjacent cables. Then the cable with this soldified coating would be wrapped directly upon the cylindrical mold after again coating it with a layer of liquid rubber. A layer of liquid rubber of approximately the belt width would be prepainted upon the surface of the cylindrical mold. The cable could then be spirally wrapped on the cylindrical mold and the remainder of the process completed as previously described. The purpose of this variation would be to eliminate the use of the inner film or strip and also to provide automatic spacing of the cables in width. In the extruded version of the coating, the external cross-section could be square or rectangular in shape so that only a thin film of the elastomer is necessary and danger of voids eliminated. Further, the extruded rectangular section permits variation of cable spacing to external elastomeric surface layer thickness. While it may have been gathered from the description, it is desired to point out that this method of fabrication of any belts with teeth is being so done that the belt is turned inside-out from its fabricated position to achieve its normal operating position. Thus, the innermost surface of the belt 68 and the diameter of the drum 50 will be equal to the desired diameter of the belt formed by the methods above.

The above description of the article and method of manufacturing thereof are but a few of the possible forms available, therefore, I do not propose to be limited by such a description but rather state that the true scope of my invention is found in the appended claims.

I claim:
1. A method of manufacture comprising the steps of:
assemblying a first mold;
molding a pattern from said first mold;
placing said pattern between a pair of sidewalls;
forming a resilient mold section with a cavity of predetermined size from said pattern between said sidewalls;
joining a plurality of said resilient mold sections to form a ring of a predetermined internal diameter having a continuous mold cavity;
placing said ring over a surface of greater diameter than said internal diameter of said ring to permit said ring to sealingly grip said surface; and
forming a product in said cavity between said ring and said surface.

2. A method of manufacture according to claim 1 and further comprising the step of stretching said ring to remove said ring from said products whereby said product may be pulled from said surface.

3. A method of manufacture comprising the steps of:
assembling a first mold by joining a first pattern to side and end walls;
creating a second pattern in said first mold;
affixing said second pattern between side and end walls;
casting a stretchable mold section from said second pattern;
joining a plurality of said stretchable mold sections to form a second mold;
stretching said second mold over a form;
forming an article of manufacture between said stretchable mold and said form; and
removing said stretchable mold to permit removal of said article.

4. A method of manufacture according to claim 3 comprising the further step of sizing said first mold and second pattern to take into account the amount of stretch of said stretchable mold to provide an article of manufacture of predetermined dimension.

5. A method of manufacture according to claim 3 wherein the forming of the article includes the step of injecting a hardenable substance into the space between said stretchable mold and said form.

6. A method of manufacture comprising the steps of:
mounting a casting having a longitudinal and transverse tooth configuration between end and side plates which are a predetermined length and width;
forming a reverse pattern from said casting of the same dimension as said casting;
forming a rubber mold section from said reverse pattern of a free length equal to said pattern;
trimming the rubber mold segment to have the desired increment of tooth length;
joining a plurality of the rubber mold segments to provide a final mold cavity of predetermined length;
expanding said final mold over a mandrel so as to create a predetermined mold dimension;
supplying an elastomeric substance in said cavity over said mandrel;
hardening said elastomeric substance; and
removing said final mold from said mandrel.

References Cited by the Examiner

UNITED STATES PATENTS

| | | | |
|---|---|---|---|
| 1,599,534 | 9/1926 | Kerley | 264—227 |
| 2,573,642 | 10/1951 | Hurry | 264—326 |
| 2,597,790 | 5/1952 | Gorecki | 264—326 |
| 2,708,773 | 5/1955 | Bacon | 264—219 |
| 2,831,359 | 4/1958 | Carle | 74—233 |
| 2,945,389 | 7/1960 | Casazza | 74—233 |
| 3,078,205 | 2/1963 | Sauer et al. | 264—326 |
| 3,183,289 | 5/1965 | Leavesley | 264—220 |

ALEXANDER H. BRODMERKEL, *Primary Examiner.*

B. SNYDER, *Assistant Examiner.*

UNITED STATES PATENT OFFICE
CERTIFICATE OF CORRECTION

Patent No. 3,278,668                 October 11, 1966

Wendell E. Eldred

It is hereby certified that error appears in the above numbered patent requiring correction and that the said Letters Patent should read as corrected below.

Column 4, line 38, after "of", second occurrence, insert -- uniform dimension. --.

Signed and sealed this 29th day of August 1967.

(SEAL)
Attest:

ERNEST W. SWIDER
Attesting Officer

EDWARD J. BRENNER
Commissioner of Patents